United States Patent
Nelson et al.

(10) Patent No.: US 6,976,161 B2
(45) Date of Patent: *Dec. 13, 2005

(54) APPARATUS AND METHOD FOR CONFIGURATION OF AN ELECTRONIC DEVICE USING A USER-FILLABLE CONFIGURATION SHEET

(75) Inventors: Marvin Duane Nelson, Meridian, ID (US); Vincent C. Skurdal, Boise, ID (US); Mark Louis Brown, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 566 days.

This patent is subject to a terminal disclaimer.

(21) Appl. No.: 10/167,705

(22) Filed: Aug. 12, 2002

(65) Prior Publication Data

US 2003/0231368 A1  Dec. 18, 2003

(51) Int. Cl.[7] ............................................. G06F 15/177
(52) U.S. Cl. ........................ 713/1; 235/454; 235/375; 358/1.1; 358/400; 358/1.18
(58) Field of Search .............................................. 713/1

(56) References Cited

U.S. PATENT DOCUMENTS

| | | | |
|---|---|---|---|
| 4,782,221 A | 11/1988 | Brass et al. | |
| 4,894,778 A | * 1/1990 | Matsumura | 378/15 |
| 4,937,439 A | 6/1990 | Wanninger et al. | |
| 5,004,896 A | 4/1991 | Serrell et al. | |
| 5,085,587 A | 2/1992 | DesForges et al. | |
| 5,204,515 A | 4/1993 | Yoshida | |
| 5,337,362 A | 8/1994 | Gormish et al. | |
| 5,430,793 A | 7/1995 | Ueltzen et al. | |
| 5,484,999 A | 1/1996 | Priddy et al. | |
| 5,712,977 A | 1/1998 | Glad et al. | |
| 5,726,435 A | 3/1998 | Hara et al. | |
| 5,837,986 A | 11/1998 | Barile et al. | |
| 5,940,627 A | 8/1999 | Luciani et al. | |
| 5,960,167 A | 9/1999 | Roberts et al. | |
| 6,031,455 A | * 2/2000 | Grube et al. | 340/539.26 |
| 6,222,638 B1 | 4/2001 | Otala | |
| 6,312,106 B1 | 11/2001 | Walker | |
| 6,410,941 B1 | * 6/2002 | Taylor et al. | 257/84 |
| 6,758,391 B1 | * 7/2004 | Pickens, III | 235/375 |
| 6,771,820 B1 | * 8/2004 | Oakeson | 382/232 |
| 6,854,650 B2 | * 2/2005 | Hattersley et al. | 235/454 |
| 2001/0019343 A1 | 9/2001 | Walker et al. | |

FOREIGN PATENT DOCUMENTS

EP  1178393  6/2002

* cited by examiner

*Primary Examiner*—A. Elamin
*Assistant Examiner*—Anand B. Patel (57) ABSTRACT

An electronic device includes a scanning device for converting indicia and markings on a printed medium into scan data and a configuration device that receives the scan data. The scanning device is capable of scanning a user-fillable configuration sheet marked by a user of the electronic device and creating the scan data, with the scan data including one or more configuration indicia. The configuration device is capable of decoding the one or more configuration indicia to create one or more corresponding configuration values and configuring the electronic device with the one or more configuration values.

37 Claims, 5 Drawing Sheets

| LOCATION | CONFIGURATION VALUE |
|---|---|
| A | CONFIGURATION A |
| B | CONFIGURATION B |
| C | CONFIGURATION C |
| ⋮ | ⋮ |

TABLE

APPARATUS AND METHOD FOR CONFIGURATION OF AN ELECTRONIC DEVICE USING A USER-FILLABLE CONFIGURATION SHEET

FIELD OF THE INVENTION

The present invention relates generally to configuration settings of an electronic device.

BACKGROUND OF THE INVENTION

Due to the flexibility and power of modern microprocessors, electronic devices may be designed to perform many tasks. One example is a combination printer/scanner/copier/facsimile device. However, such devices are not without drawbacks. For example, such powerful and flexible devices must be configured before use. The configurations may include configurations of device functions, configurations for geographic regions, configurations for default values (i.e., paper sizes, fax speed dial numbers, etc.), among other things. Consequently, there may be many configuration values and choices.

In one prior art approach to configuration, a configuration process is performed at the factory by the manufacturer. This may include electronically downloading data into the memory of the device.

However, this prior art approach has several drawbacks. It delays shipping. It is time-consuming for a worker to un-box, connect, configure, and repackage each electronic device. Most of all, it is relatively expensive and requires a significant amount of man-hours to perform.

In another prior art approach, the manufacturer provides multiple configuration data sets in a memory of the electronic device. Therefore, the user may configure the electronic device by selecting an appropriate data set or sets.

However, one drawback to this prior art approach is that the cost of the excess (and unused) memory is a significant addition to the purchase price. In addition, the set-up may be difficult and time-consuming for the purchaser, especially if the purchaser is not knowledgeable about the particular device. Moreover, the user interface (such as a printer control panel, for example) may offer very limited configuration ability, i.e., no large display screen for displaying instructions, menus, choices, diagrams, etc. for the benefit of the person configuring the electronic device.

In yet another prior art approach, the purchaser is left to program the device and enter in any settings. This has obvious drawbacks in that the set-up may be difficult and time-consuming for the purchaser to perform, especially if the purchaser is not proficient in using the particular electronic device. In addition, for an electronic device that is used by multiple users, such as in an institutional setting, configuring and reconfiguring an electronic device may be too difficult and time-consuming for each user. Moreover, the user interface electronic device may again offer limited configuration ability.

Therefore, there remains a need in the art for improvements in the configuration of an electronic device.

SUMMARY OF THE INVENTION

An electronic device comprises a scanning device for converting indicia and markings on a printed medium into scan data and a configuration device that receives the scan data. The scanning device is capable of scanning a user-fillable configuration sheet marked by a user of the electronic device and creating the scan data, with the scan data including one or more configuration indicia. The configuration device is capable of decoding the one or more configuration indicia to create one or more corresponding configuration values and configuring the electronic device with the one or more configuration values.

DETAILED DESCRIPTION

Figure 1:
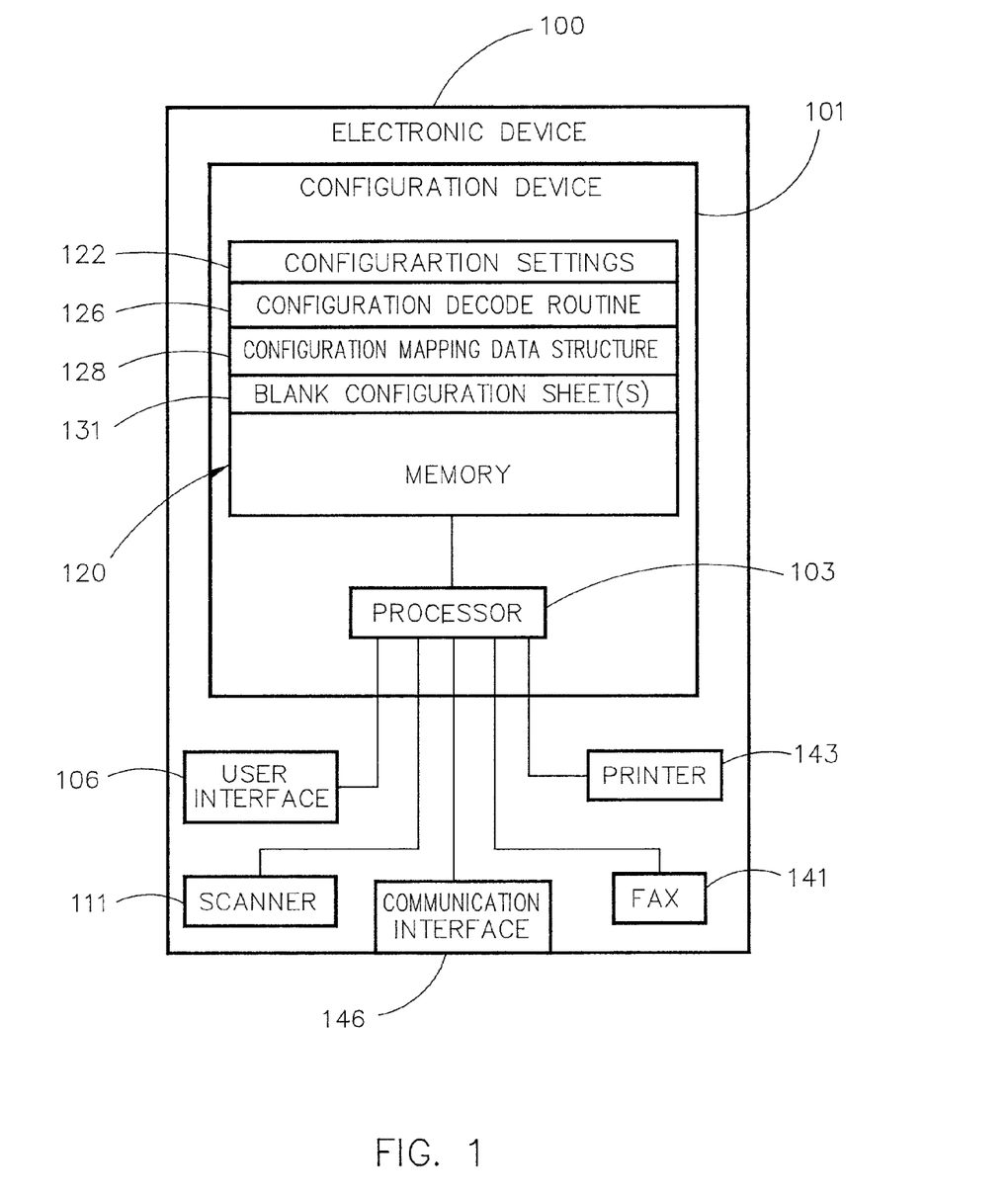
FIG. 1 is a block diagram of an electronic device according to one embodiment of the invention.

FIG. 1 is a block diagram of an electronic device 100 according to one embodiment of the invention. The electronic device 100 includes a scanner 111 and a configuration device 101. In addition, the electronic device 100 may include a user interface 106, a communications interface 146, a fax 141, and a printer 143. The configuration device 101 may further comprise a memory 120 and a processor 103 that operates in conjunction with the memory 120 in order to configure the electronic device 100. The electronic device 100 may be, for example, a combination scanner/printer, a combination fax/scanner/printer, a copier, a combination copier/scanner/fax/printer, etc.

The scanner 111 may be an integral component of the electronic device 100 or may be connected to and in communication with the electronic device 100. The scanner 111 may be a flatbed scanner, a portable scanner, a sheet-feed scanner including an automatic document feeder, etc. The scanner 111 scans a printed medium, such as a sheet of paper bearing printed symbols and characters, and generates a digital representation thereof in the form of scan data. The configuration device 101 receives the scan data from the scanner 111 and decodes and configures the electronic device 100 according to the information born by the printed medium.

The user interface 106 may accept user inputs and may generate visual outputs to the user. The user interface 106 may include a keyboard or keypad, various input buttons and switches, etc. In addition, the user interface 106 may include a display screen such as a cathode ray tube (CRT) display, a liquid crystal display (LCD), a light emitting diode (LED) display, etc. Alternatively, the user interface 106 may include a touch screen that accomplishes both input and output functions.

The facsimile 141 is an optional component that may perform typical facsimile functions. The facsimile 141 may be used for transmitting outgoing faxes and receiving incoming faxes.

The printer 143 is another optional component. The printer 143 may be an integral component of the electronic device 100, or may be connected to and in communication with the electronic device 100. The printer 143 may generate normal printed output. In addition, the printer 143 may be used to print out blank user-fillable configuration sheets 131.

The communication interface 146 may be any type of digital communication interface, such as a modem, a computer network card, a wireless interface, etc. The communication interface 146 enables digital communication between the electronic device 100 and other electronic devices. For example, the communication interface 146 may allow the electronic device 100 to communicate over any manner of digital network, such as a local area network (LAN), a wide-area network (WAN), the Internet, etc.

The processor 103 may be any type of general purpose processor. The processor 103 executes a control routine contained in the memory 120. In addition, the processor 103 receives inputs and controls operations of the electronic device 100.

The memory 120 may be any type of digital memory. The memory 120 may store, among other things, configuration settings 122, a configuration decode routine 126, a configuration mapping data structure 128, and one or more blank configuration sheets 131. In addition, the memory 120 may store software or firmware to be executed by the processor 103.

The configuration settings 122 control at least some of the normal operations of the electronic device 100. The configuration settings 122 may include fax speed dial numbers, default paper sizes, default fax resolutions, default copy quality settings, fax phone book entries, blocked fax numbers, default fax received behavior (i.e., whether an incoming fax is stored to memory, is printed on demand, is printed immediately, is both stored and printed, etc.), fax auto-answer/number of rings to answer, default telecom behavior, default copy quality, default copy contrast, default number of copies, default copy paper type, default copy paper size, default paper tray, default duplexing, default Nup (i.e., the number of pages to be printed on a single sheet of paper), default scaling information (i.e., information regarding reduction or enlargement), default language for the configuration page, default behaviors for scanner bulb management (how long does the bulb stay illuminated after the last copy/scan, does the bulb have different characteristics during the work day versus evening/weekends, etc.), audio volume for alarms, audio volume for modem tones, audio volume for key presses, copy collation default (on/off), fuser temperature model, power save times, print density, fax error correction, fax modem protocol (V34, V17, etc.), fax forwarding information (i.e., information for forwarding an incoming fax to another fax machine), fax header information, fax silent detect, fax extension phone setting, fax answer ring type (single, double, triple, etc.), fax answer mode (automatic/manual), fax dial prefix, fax detect dial tone, fax behavior when no answer/busy, (retry count, etc.). Other configuration values may be included, and the listing above is not exhaustive.

The configuration decode routine 126 may be a software routine that locates and decodes fillable target areas 204 from a scanned user-fillable configuration sheet 200 (see FIG. 2) in order to configure the electronic device 100. The configuration decode routine 126 may use the configuration mapping data structure 128 to achieve the locating and decoding operations (see FIG. 3 and the accompanying discussion below).

The configuration mapping data structure 128 maps marked fillable target areas 204 to corresponding configuration settings, i.e., a marked fillable target area 204 may be mapped to a particular configuration setting such as a paper size setting, for example. The decoding therefore may comprise mapping a fillable target area to a configuration value.

The one or more blank user-fillable configuration sheets 131 may be internally stored blank configuration sheets that may be printed out for use. A blank user-fillable configuration sheet 131 may be printed out at any time. For example, a blank user-fillable configuration sheet 131 may be printed out when the electronic device 100 is first unboxed and set up. Alternatively, a blank user-fillable configuration sheet 131 may be printed out and used at a later time. In addition, blank user-fillable configuration sheets 131 may be printed out for various users of the electronic device and each user may have his or her own set of configuration sheets for configuring the electronic device 100. Therefore, each user may configure the electronic device 100 when needed.

In operation, the user marks all appropriate fillable target areas 204 of a user-fillable configuration sheet 200 (see FIG. 2 and the accompanying discussion below). By doing so, the user selects desired settings and configuration values of the electronic device 100. The user then scans the filled out sheet into the electronic device 100, using the scanner 111. The electronic device 100 decodes the scanned configuration sheet using the configuration decode routine 126 and the configuration mapping data structure 128 in order to obtain configuration values. The decoded configuration values are loaded into the configuration settings 122 of the memory 120, therefore configuring or re-configuring the electronic device 100.

The configuration may be performed when the device is first purchased and set up and may additionally be done at any time as needed. In addition, as previously mentioned, various users may configure the electronic device to their own settings. This may include each user having his or her own set of configuration sheets to be used when needed. Therefore, a user can quickly and easily configure the electronic device 100.

Figure 2:
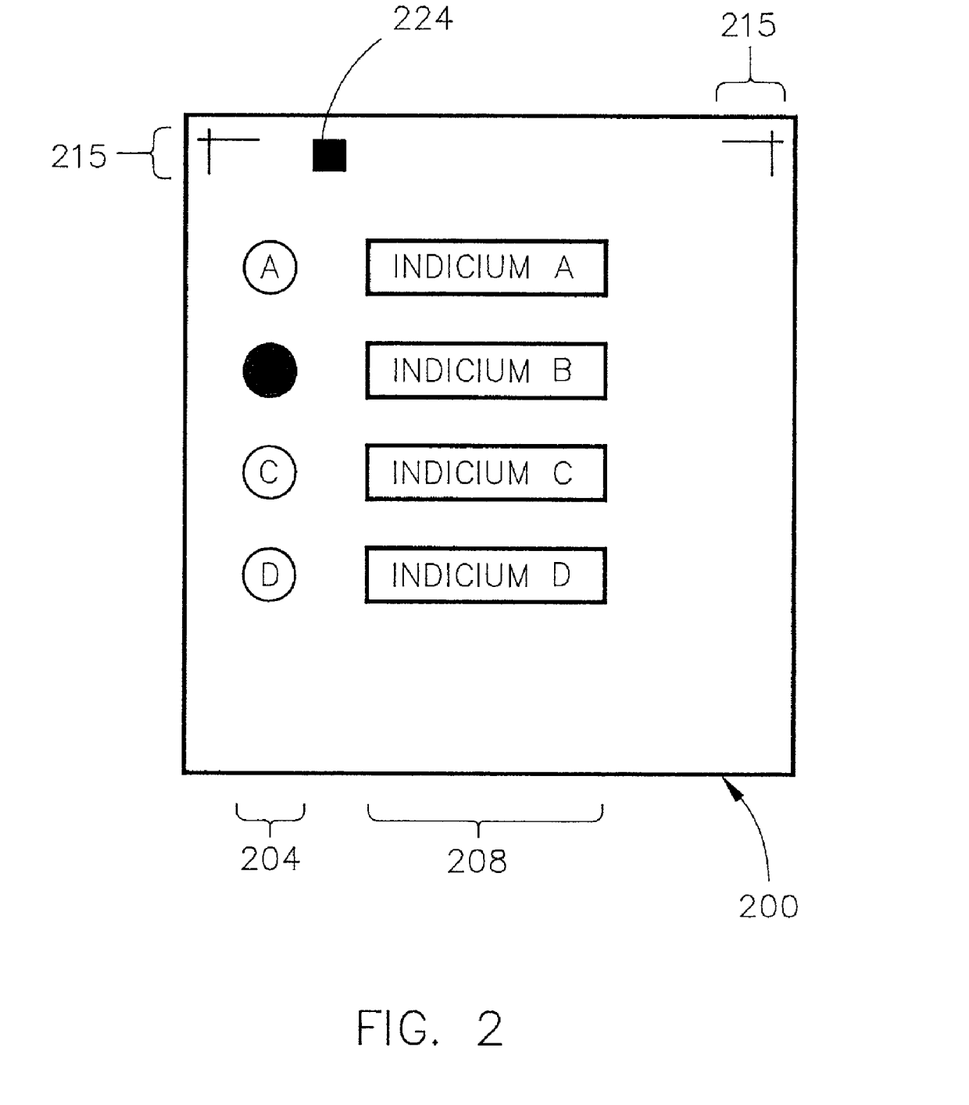
FIG. 2 is a diagram of a user-fillable configuration sheet according to another embodiment of the invention.

FIG. 2 is a diagram of a user-fillable configuration sheet 200 according to another embodiment of the invention. The user-fillable configuration sheet 200 includes one or more fillable target areas 204 and one or more target indicia 208. The user-fillable configuration sheet 200 may further include one or more alignment marks 215 and one or more identification marks 224.

The user-fillable configuration sheet 200 may be any type of printed medium that is capable of being scanned, such as a paper sheet, for example. The printed medium may be of any needed size, including common paper sizes such as 8½×11 inches.

A fillable target area 204 may be formed or printed at a predetermined location and may receive any manner of marking upon the user-fillable configuration sheet 200. The fillable target area 204 may be a circle, as shown, or any manner of fillable region including rectangles, ovals, boxes, etc. A particular target indicium 208 describes a corresponding configuration option for a particular fillable target area 204. A user may select configuration options by marking one or more of the fillable target areas 204, such as with a pen, pencil, marker, etc. This may include filling out a fillable target area 204 by hand or by using a machine, such as a printer or typewriter, a stamp, etc.

The particular target indicium 208 may give a written explanation of the configuration option. The particular target indicium 208 may provide more information than is possible to provide through a display screen of the electronic device 100. In addition, the particular target indicium 208 may ask questions that aid in the configuration process. For example, the question may ask what paper size is to be used. One or more fillable target areas 204 corresponding to the question may be included. As a result, the user may specify one or more paper sizes. For example, for European markets, the electronic device 100 may need to include an A4 (European) paper size which may or may not need to be included if the electronic device 100 is to be used in the United States.

In one embodiment, the shape of a particular fillable target area 204 may correspond in some manner to the configuration data type, i.e., a paper size setting may include a fillable target area 204 that is rectangular, while a fax speed dial fillable target area 204 may be a phone outline, for example. Alternatively, the location of a particular fillable target area 204 may be used to decode the function of the particular fillable target area 204. For example, the decoding may compare an (x,y) location of a particular fillable target area 204 to a table. The decoding may find a positional match in the table and therefore may readout a corresponding configuration value or values (see FIG. 3 below).

The one or more alignment marks 215 may be included in one or more corner regions of the user-fillable configuration sheet 200. The one or more alignment marks 215 identify a scanned user-fillable configuration sheet 200 and additionally identifies a sheet in a series of multiple sheets (if multiple sheets exist). By identifying a particular sheet, the electronic device 100 can determine the configuration values born by the particular sheet. In addition, the one or more alignment marks 215 may align and register the user-fillable configuration sheet 200. In one embodiment, the alignment mark 215 is asymmetrical, and therefore can be used by the electronic device 100 to determine the amount of paper skew, the amount of paper deformation, and the amount of image stretch due to the characteristics of the scanner 111 (such as an unexpected end of paper, for example). These determinations are helpful in locating and decoding fillable target areas 204. In addition, the shape and asymmetry of the one or more alignment marks 215 may be discriminated from a line border printed on the user-fillable configuration sheet 200.

The one or more identification marks 224 identify a particular user-fillable configuration sheet 200, such as when a sheet is one of a series of sheets. The one or more identification marks 224 may comprise one or more identifying characters or symbols, such as the rectangles shown. It should be understood that any manner of characters or symbols may be used, and the single rectangle shown is merely for purposes of illustration and is not limiting.

Figure 3:
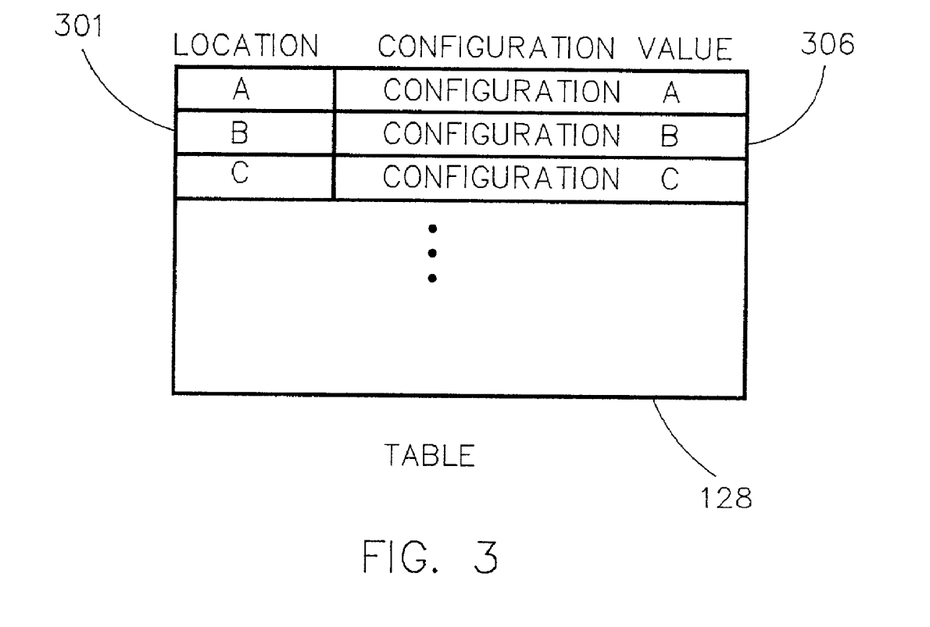
FIG. 3 is a diagram of a configuration mapping data structure according to yet another embodiment of the invention.

FIG. 3 is a diagram of a configuration mapping data structure 128 according to yet another embodiment of the invention. The configuration mapping structure 128 in this embodiment is a table that maps a physical location, such as an (x, y) location of a fillable target area 204, to a corresponding configuration value or values. In the example shown, fillable target area B (see FIG. 2) was marked and is mapped to the location entry 301. The location entry 301 generates a configuration value 306, i.e., it generates an output of configuration B data.

Figure 4:
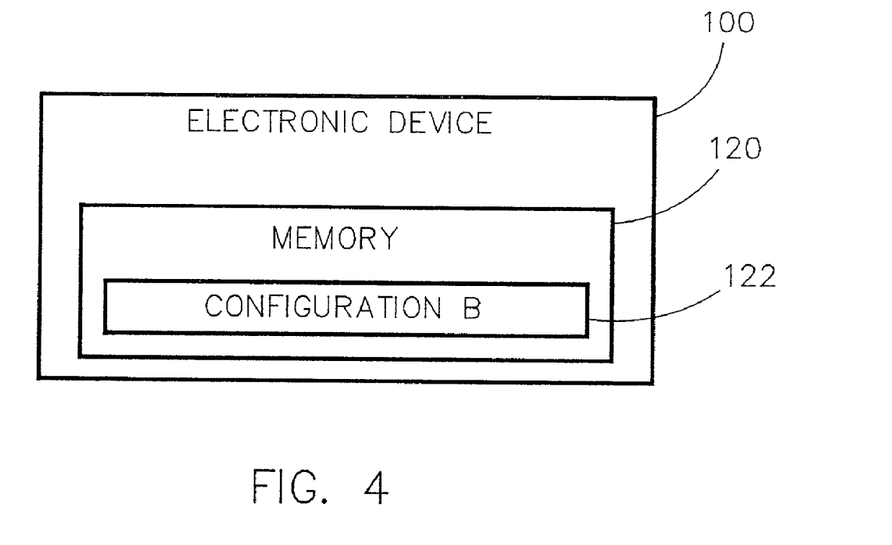
FIG. 4 is a block diagram of the electronic device wherein a user-fillable configuration sheet has been marked and scanned in order to select a target indicium B.

FIG. 4 is a block diagram of the electronic device 100 wherein a user-fillable configuration sheet 200 has been marked and scanned in order to select the target indicium B. As a result, the electronic device 100 has configuration B data loaded into the memory 120, with the configuration B data therefore configuring the electronic device 100.

Figure 5:
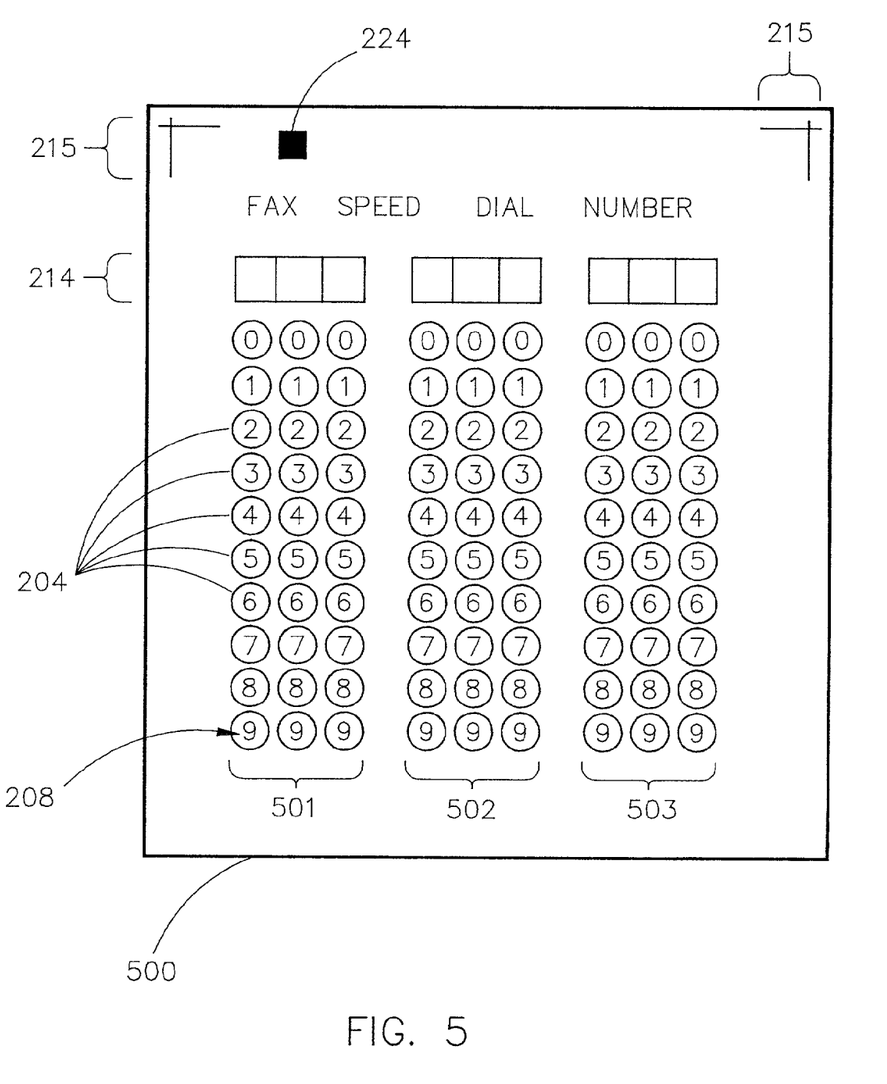
FIG. 5 is a diagram of a fax speed dial number entry sheet according to yet another embodiment of the invention.

FIG. 5 is a diagram of a fax speed dial number entry sheet 500 according to yet another embodiment of the invention. For each telephone number digit, the fax speed dial number entry sheet 500 may include ten fillable target areas 204 for selecting a digit in the range of 0 to 9. Using the fax speed dial number entry sheet 500, the user may darken the appropriate fillable target areas 204 in order to specify the digits of a fax speed dial number to be programmed into the electronic device 100. One fillable target area 204 of each column may receive a telephone number digit marking. Alternatively, the fax speed dial number entry sheet 500 may include writable target areas 214. The writable target areas 214 accept hand or machine written numbers that are substantially inside the writable target areas 214. The electronic device 100 may extract the numbers using any character recognition routine.

Each fillable target area 204 includes a target indicium 208 in the form of a particular number (0–9). It should be understood that the target indicium 208 may be printed inside a fillable target area 204, as shown, or may be adjacent to the fillable target area 204 (i.e., it may be outside the fillable target area 204).

The fax speed dial number entry sheet 500 may accommodate varying numbers of digits, as shown in columns 501, 502, and 503. For example, an area code may be included if needed. In addition, an international dialing prefix (not shown) may be included.

Figure 6:
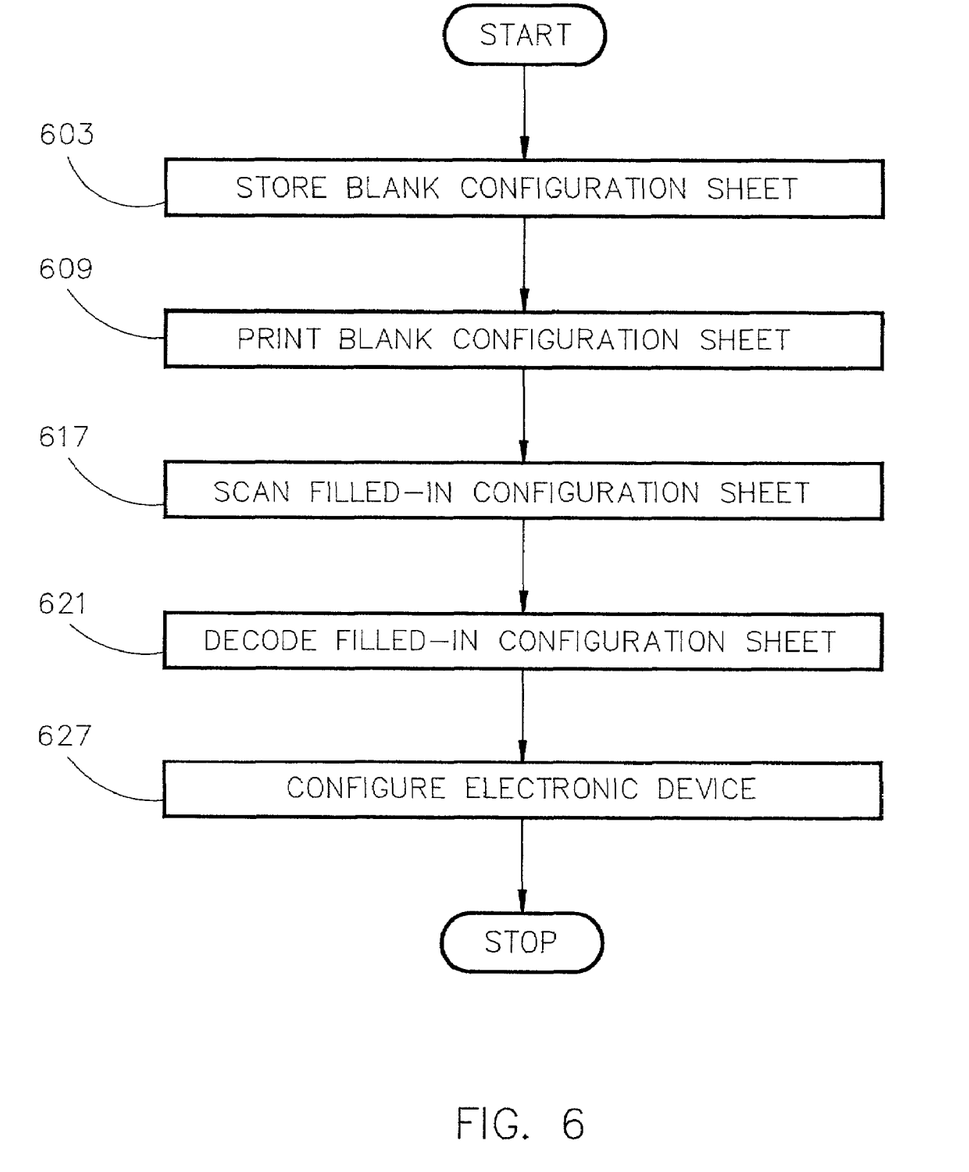
FIG. 6 illustrates, in flowchart form, the operations performed by another embodiment of the invention.

FIG. 6 illustrates, in flowchart form, the operations performed by another embodiment of the invention. In block 603, a blank configuration sheet is stored in the memory 120 of the electronic device 100 (i.e., an unmarked user-fillable configuration sheet 200). This may include multiple blank sheets, if needed. Alternatively, one or more blank user-fillable configuration sheets 200 may be included in a shipping carton or on an exterior of the shipping carton of the electronic device 100.

In block 609, one or more blank user-fillable configuration sheets 200 are printed out by the electronic device 100 or by a printer connected to and in communication with the electronic device 100. This block is only performed if a blank user-fillable configuration sheet 200 is stored in the memory 120.

The printout may be automatic at a first power-up of the electronic device 100. For example, when the device is powered up and a print count is zero, one or more blank user-fillable configuration sheets 200 may be automatically printed. Alternatively, the user may be prompted for a printout, or the user may independently initiate a printout. The user may initiate a printout through the user interface 106, for example. The user may mark appropriate fillable target areas 204, thereby choosing among the available configuration options.

In block 617, the filled configuration sheet or sheets are scanned into the electronic device 100. The scanning may be done by an integral or connected scanner 111. The scanning creates scan data that is a digital representation of the filled configuration sheet or sheets.

In block 621, the scan data is decoded, as previously discussed. The decoding creates one or more configuration values.

In block 627, the electronic device is configured according to the decoded configuration values. A configuration value may be any of the variables previously discussed, or may include additional ones.

The user-fillable configuration sheets 200 may be employed in any electronic device 100 that communicates with a scanner 111. The invention therefore does not require excess memory for storing a plurality of configuration data sets. In addition, the invention does not require configuration of the electronic device 100 at the factory, and the invention does not require complex user interaction for the configuration.

The configuration of the electronic device 100 using a user-fillable configuration sheet 200 provides several benefits. The invention provides an easy and quick configuration process. The filling and scanning of configuration sheets is much faster than reading a manual and entering configuration settings through a limited capability user interface. In addition, the invention provides a more natural and user-friendly configuration process than is provided in the prior art. In addition, the configuration sheets can include questions that are articulated with greater accuracy than may be achieved on a display panel, due to the lengthy text that may be accommodated in order to explain each configuration option.

Another benefit is that a filled configuration sheet or sheets may be repeatedly used. For example, the user may have multiple configuration sheet sets and can easily switch between the configurations by rescanning the configuration sheet sets. At any point in time, the user can restore his or her custom settings.

Yet another benefit is that each user may have his or her own set of configuration sheets. Therefore, multiple users may use the electronic device 100 and may be able to easily and quickly reconfigure the electronic device 100 for their use.

Yet another benefit is that the invention enables a simpler user interface that does not need any special capabilities. As a result, fewer buttons or input devices may be needed. For example, there is no need for a numeric keypad (i.e., no need for entry of codes or parameters) and a simpler display may be used (i.e., no need to display text).

Yet another benefit is that the invention enables the purchaser to review a complete set of configuration settings and/or options. As a result, there is no need for multiple menus. Consequently, it is easier for the user to understand and review the configuration process. Furthermore, having a complete listing of configurations and configuration options will make it easier for the user to grasp the capabilities of the electronic device 100, especially if the electronic device 100 performs multiple functions.

We claim:

1. An electronic device, comprising:
   a scanning means for converting indicia and markings on a printed medium into scan data; and
   a configuration means that receives said scan data;
   wherein said scanning means is capable of scanning a user-fillable configuration sheet marked by a user of said electronic device and creating said scan data, with said scan data including one or more configuration indicia, and wherein said configuration means is capable of decoding said one or more configuration indicia to create one or more corresponding configuration values and configuring said electronic device with said one or more configuration values, and wherein as part of the decoding capability said configuration means is capable of identifying a particular user-fillable configuration sheet of one or more user-fillable configuration sheets.

2. The electronic device of claim 1, further comprising a user interface capable of accepting user inputs and generating visual outputs.

3. The electronic device of claim 1, further comprising a printer.

4. The electronic device of claim 1, further comprising a copier.

5. The electronic device of claim 1, further comprising a facsimile.

6. The electronic device of claim 1, further comprising a communication interface capable of conducting digital communication.

7. An electronic device, comprising:
   a scanning means for converting indicia and markings on a printed medium into scan data; and
   a configuration means that receives said scan data and stores one or more blank user-fillable configuration sheets;
   wherein said scanning means is capable of scanning a user-fillable configuration sheet marked by a user of said electronic device and creating said scan data, with said scan data including one or more configuration indicia, and wherein said configuration means is capable of decoding said one or more configuration indicia to create one or more corresponding configuration values and configuring said electronic device with said one or more configuration values.

8. An electronic device, comprising:
   a scanner capable of scanning a printed medium and generating scan data;
   a memory including one or more configuration settings, a configuration decode routine, and a configuration mapping data structure; and
   a processor communicating with said memory and said scanner and receiving said scan data;
   wherein said electronic device is capable of scanning a user-fillable configuration sheet marked by a user of said electronic device and creating said scan data, with said scan data including one or more configuration indicia, decoding said one or more configuration indicia to create one or more corresponding configuration values including identifying a particular user-fillable configuration sheet of one or more user-fillable configuration sheets as part of said decoding, and configuring said electronic device with said one or more configuration values.

9. The electronic device of claim 8, further comprising a user interface capable of accepting user inputs and generating visual outputs.

10. The electronic device of claim 8, further comprising a printer.

11. The electronic device of claim 8, further comprising a copier.

12. The electronic device of claim 8, further comprising a facsimile.

13. The electronic device of claim 8, further comprising a communication interface capable of conducting digital communication.

14. The electronic device of claim 8, wherein said configuration mapping data structure maps a marked fillable target area to a configuration value.

15. The electronic device of claim 8, wherein said configuration mapping data structure comprises a table.

16. An electronic device, comprising:
   a scanner capable of scanning a printed medium and generating scan data;
   a memory including one or more blank user-fillable configuration sheets, one or more configuration settings, a configuration decode routine, and a configuration mapping data structure; and
   a processor communicating with said memory, and said scanner and receiving said scan data;
   wherein said electronic device is ceosbie of scanning a user-fillable configuration sheet marked by a user of said electronic device and creating said scan data, with said scan data including one or more configuration indicia, decoding said one or more configuration indicia to create one or more corresponding configuration values, and configuring said electronic device with said one or more configuration values.

17. A user-fillable configuration sheet, comprising:
    a printable medium;
    one or more fillable target areas formed on said user-fillable configuration sheet at predetermined locations, with a fillable target area being capable of receiving a marking;
    one or more target indicia formed on said user-fillable configuration sheet and corresponding to said one or more fillable target areas; and
    one or more alignment marks formed on said user-fillable configuration sheet;
    wherein said predetermined locations of said one or mare fillable target areas specify predetermined configuration values and wherein said user-fillable configuration sheet is capable of accepting markings that specify configuration values.

18. The user-fillable configuration sheet of claim 17, wherein an alignment mark of said one or more alignment marks is formed substantially in a corner region of said user-fillable configuration sheet.

19. The user-fillable configuration sheet of claim 17, wherein an alignment mark of said one or more alignment marks is non-symmetric.

20. The user-fillable configuration sheet of claim 17, further comprising one or more identification marks that identify a particular user-fillable configuration sheet of one or more user-fillable configuration sheets.

21. The user-fillable configuration sheet of claim 17, with said user-fillable configuration sheet comprising a user-fillable fax speed dial configuration sheet, wherein a fillable target area of said one or more fillable target areas is capable of receiving a telephone number digit marking.

22. The user-fillable configuration sheet of claim 17, with said user-fillable configuration sheet comprising a user-fillable fax speed dial configuration sheet including a plurality of writable target areas capable of accepting hand or machine written fax speed dial numbers.

23. A user-fillable fax speed dial configuration sheet, comprising:
    a printable medium;
    one or more fillable target areas formed on said user-fillable fax speed dial configuration sheet at predetermined locations, with a fillable target area being capable of receiving a telephone number digit marking;
    one or more target indicia formed on said user-fillable fax speed dial configuration sheet and corresponding to said one or more fillable target areas; and
    one or more alignment marks formed on said user-fillable fax speed dial configuration sheet;
    wherein said predetermined locations of said one or more fillable target areas specify predetermined configuration values and wherein said user-fillable fax speed dial configuration sheet is capable of accepting markings that specify fax speed dial numbers.

24. The user-fillable fax speed dial configuration sheet of claim 23, wherein an alignment mark of said one or more alignment marks is formed substantially in a corner region of said user-fillable configuration sheet.

25. The user-fillable fax speed dial configuration sheet of claim 23, wherein an alignment mark of said one or more alignment marks is non-symmetric.

26. The user-fillable fax speed dial configuration sheet of claim 23, further comprising one or more identification marks that identify a particular user-fillable fax speed dial configuration sheet of one or more user-fillable fax speed dial configuration sheets.

27. The user-fillable fax speed dial configuration sheet of claim 23, further comprising a plurality of writable target areas capable of accepting hand or machine written fax speed dial numbers.

28. A configuration method for an electronic device that includes a scanner, comprising the steps of:
    storing one or more blank user-fillable configuration sheets in a digital memory of said electronic device, wherein said one or more blank user-fillable configuration sheets may be printed out and marked;
    scanning a user-fillable configuration sheet marked by a user of said electronic device to create scan data including one or more configuration indicia;
    decoding said one or more configuration indicia to create corresponding configuration values; and
    configuring said electronic device with said configuration values.

29. The method of claim 28, further comprising marking one or more fillable target areas on said user-fillable configuration sheet to create a filled configuration sheet.

30. The method of claim 28, wherein the step of decoding further comprises mapping a selected fillable target area to a configuration value.

31. The method of claim 28, with the decoding step further comprising the steps of:
    locating one or more alignment marks on said user-fillable configuration sheet;
    registering said user-fillable configuration sheet using said one or more alignment marks;
    locating one or more identification marks on said user-fillable configuration sheet; and
    identifying said user-fillable configuration sheet as being a particular user-fillable configuration sheet of said one or more user-fillable configuration sheets using said one or more identification marks.

32. The method of claim 28, wherein said user-fillable configuration sheet comprises:
    a printable medium;
    one or more fillable target areas formed on said user-fillable configuration sheet at predetermined locations, with a fillable target area being capable of receiving a marking:
    one or more target indicia formed on said user-fillable configuration sheet and corresponding to said one or more fillable target areas;
    one or more alignment marks formed on said user-fillable configuration sheet; and
    one or more identification marks formed on said user-fillable configuration sheet;
    wherein said predetermined locations of said one or more fillable target areas specify predetermined configuration values and wherein said user-fillable configuration sheet is capable of accepting markings that specify configuration values.

33. A configuration method for an electronic device that includes a scanner and a printer, comprising the steps of:
    creating a user-fillable configuration sheet including storing one or more blank user-fillable configuration sheets in a digital memory of said electronic device and printing out said user-fillable configuration sheet from said one or more blank user-fillable configuration sheets stored in said electronic device;

scanning a filled configuration sheet that has been marked in one or more fillable target areas on said user-fillable configuration sheet to create a filled configuration sheet;

decoding marked fillable target areas of said filled configuration sheet to create corresponding configuration values; and configuring said electronic device with said configuration values.

34. The method of claim 33, further comprising marking one or more fillable target areas on said user-fillable configuration sheet to create said filled configuration sheet.

35. The method of claim 33, wherein the step of decoding further comprises mapping a selected fillable target area to a configuration value.

36. The method of claim 33, with the decoding step further comprising the steps of:

locating one or more alignment marks on said user-fillable configuration sheet;

registering said user-fillable configuration sheet using said one or more alignment marks;

locating one or more identification marks on said user-fillable configuration sheet; and identifying said user-fillable configuration sheet as being a particular user-fillable configuration sheet of said one or more user-fillable configuration sheets using said one or more identification marks.

37. The method of claim 33, wherein said user-fillable configuration sheet comprises:

a printable medium;

one or more fillable target areas formed on said user-fillable configuration sheet at predetermined locations, with a fillable target area being capable of receiving a marking;

one or more target indicia formed on said user-fillable configuration sheet and corresponding to said one or more fillable target areas;

one or more alignment marks formed on said user-fillable configuration sheet; and one or more identification marks formed on said user-fillable configuration sheet;

wherein said predetermined locations of said one or more fillable target areas specify predetermined configuration values and wherein said user-fillable configuration sheet is capable of accepting markings that specify configuration values.

* * * * *

UNITED STATES PATENT AND TRADEMARK OFFICE
CERTIFICATE OF CORRECTION

PATENT NO. : 6,976,161 B2  Page 1 of 1
APPLICATION NO. : 10/167705
DATED : December 13, 2005
INVENTOR(S) : Marvin Duane Nelson et al.

It is certified that error appears in the above-identified patent and that said Letters Patent is hereby corrected as shown below:

On the Title page, in Item (22), in "Filed", in column 1, line 1, delete "Aug." and insert -- Jun. --, therefor.

In column 6, line 16, delete "tillable" and insert -- fillable --, therefor.

In column 8, line 62, in Claim 16, after "memory" delete ",".

In column 8, line 64, in Claim 16, delete "ceosbie" and insert -- capable --, therefor.

In column 9, line 16, in Claim 17, delete "mare" and insert -- more --, therefor.

In column 10, line 47, in Claim 32, after "marking" delete ":" and insert -- ; --, therefor.

Signed and Sealed this

Seventh Day of July, 2009

JOHN DOLL
*Acting Director of the United States Patent and Trademark Office*